United States Patent
Wood

(10) Patent No.: US 7,901,815 B2
(45) Date of Patent: Mar. 8, 2011

(54) FUEL CELL POWER GENERATOR UTILIZING SUBSTANTIALLY OR COMPLETELY CLOSED WATER SUPPLY

(75) Inventor: Roland A. Wood, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1121 days.

(21) Appl. No.: 10/891,380

(22) Filed: Jul. 14, 2004

(65) Prior Publication Data

US 2006/0014059 A1   Jan. 19, 2006

(51) Int. Cl.
H01M 8/06 (2006.01)
H01M 8/18 (2006.01)

(52) U.S. Cl. ......... 429/414; 429/408; 429/416; 429/417; 429/420; 429/423

(58) Field of Classification Search .................... 429/38, 429/19, 27, 30, 34
See application file for complete search history.

(56) References Cited

U.S. PATENT DOCUMENTS 5,202,195 A * 4/1993 Stedman et al. ............... 429/17
6,403,249 B1 * 6/2002 Reid ............................. 429/39

2003/0044656 A1   3/2003  Wood
2003/0091877 A1   5/2003  Chen et al.
2003/0228252 A1  12/2003  Shurtleff

FOREIGN PATENT DOCUMENTS

EP       1 170 249 A1    1/2002

OTHER PUBLICATIONS

"U.S. Appl. No. 10/891,380, Non Final Office Action mailed Mar. 11, 2008", 14 pgs.
"Chinese Application Serial No. 200580030690.4, Office Acion mailed May 21, 2008", OAR-MISC, 45.
"Letter from Associate dated Jun. 30, 2009 interpreting Chinese Office Action", 2.
"U.S. Appl. No. 10/891,380, Advisory Action mailed Aug. 16, 2010", 3 pgs.

* cited by examiner

*Primary Examiner* — Dah-Wei D Yuan
*Assistant Examiner* — Kwang Han
(74) *Attorney, Agent, or Firm* — Schwegman, Lundberg & Woessner P.A.

(57) ABSTRACT

A power generator has a hydrogen flow path through which moisture is induced to flow to a hydrogen-containing fuel that reacts with the moisture to produce hydrogen. The moisture passes to the hydrogen flow path through a water exchange membrane from a water vapor flow path. A fuel cell between the hydrogen flow path and the water vapor flow path reacts with the hydrogen in the hydrogen flow path to produce electricity, and to also principally produce the moisture in the water vapor flow path.

26 Claims, 3 Drawing Sheets

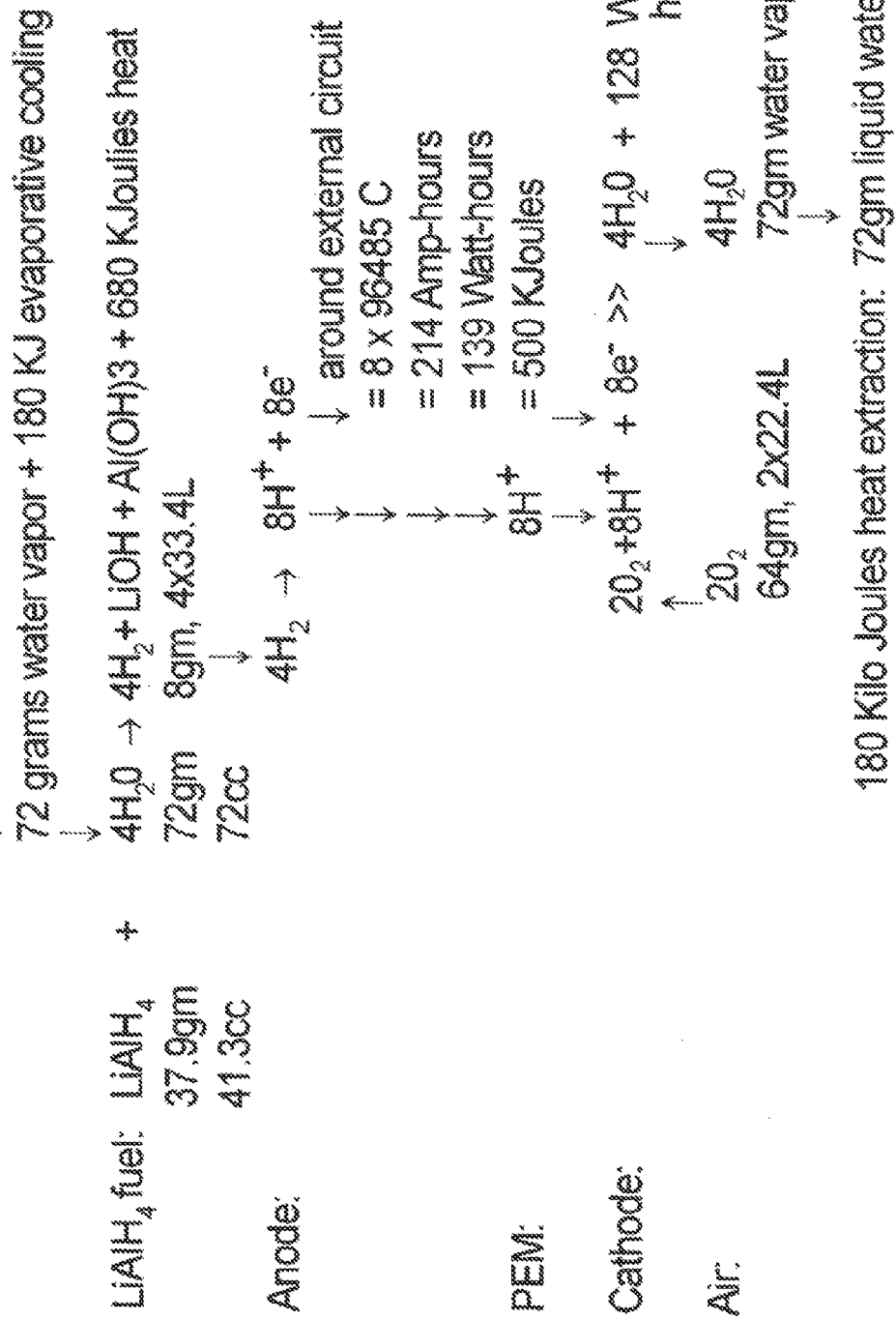

FIG. 3

Liquid Water Fuel:    $4H_2O$ (4 moles, 72 gm input water)
    ↓
72 grams water vapor + 180 KJ evaporative cooling
    ↓

LiAlH₄ fuel:   $LiAlH_4$ + $4H_2O$ → $4H_2$ + $LiOH$ + $Al(OH)_3$ + 680 KJoules heat
      37.9gm     72gm    8gm, 4×33.4L
      41.3cc     72cc       ↓

Anode:   $4H_2$ → $8H^+$ + $8e^-$
    ↓    ↓ around external circuit
    ↓      = 8 × 96485 C
    ↓      = 214 Amp-hours
    ↓      = 139 Watt-hours
    ↓      = 500 KJoules

PEM:   $8H^+$
    ↓

Cathode:   $2O_2 + 8H^+ + 8e^-$ >> $4H_2O$ + 128 Watt hr heat
    ↑             ↓
   $2O_2$       $4H_2O$ Air:   64gm, 2×22.4L     72gm water vapor
                           ↓

180 Kilo Joules heat extraction: 72gm liquid water

FUEL CELL POWER GENERATOR UTILIZING SUBSTANTIALLY OR COMPLETELY CLOSED WATER SUPPLY

TECHNICAL FIELD OF THE INVENTION

The present invention relates to electrical power generators.

BACKGROUND OF THE INVENTION

There is an ongoing but urgent need for lighter weight sources of electricity for many applications, such as battlefield applications, unmanned aircraft, and unattended wireless sensors. Presently, the power source that is primarily used is the lithium battery. However, the energy capability of lithium batteries, for a given weight of the battery, is limited.

It is desirable to increase the power of electrical sources by many times, thus making it possible to materially increase the operating life of electronic equipment without adding weight.

The assignee of the present invention has previously developed a high performance micropower source 10 shown in FIG. 1. The micropower source 10 includes a water reservoir 12, a water permeable membrane 13, a solid fuel reservoir 14, and a pneumatic valve 16. The water reservoir 12 may be arranged to hold, for example, a small amount of water such as a few cc. The solid fuel reservoir 14 contains, for example, a solid fuel such as a few grams of a metal hydride such as LiAlH4.

The water reservoir 12 is connected to the solid fuel reservoir 14 by way of the pneumatic valve 16. As the water in the water reservoir 12 evaporates and permeates through the water permeable membrane 13, the resulting water vapor diffuses through the pneumatic valve 16 and reacts with the fuel in the solid fuel reservoir 14 to produce hydrogen gas. The pneumatic valve 16 senses the internal hydrogen gas pressure, and regulates the diffusion of the water vapor to maintain a fixed internal hydrogen gas pressure, usually slightly above atmospheric pressure.

One or more fuel cells 18 of the micropower source 10 convert the hydrogen gas to an output voltage. For example, the fuel cells 18 may be miniature proton exchange membrane (PEM) fuel cells each having a 1 mm diameter Nafion membrane, with one side in contact with air, that converts hydrogen to a dc output voltage.

One the advantages of using water vapor over liquid water is that water vapor produces essentially a 100% complete reaction with the solid fuel without the caking and clogging typically observed with the use of liquid water.

The micropower source 10 can generate up to 1.25 Watt-hours per gram of its weight, compared to 0.25 Watt-hours per gram from typical primary lithium batteries. The stored energy (3.1 Watt-hours) of the micropower source 10 requires only about 2.5 grams of fuel weight (e.g., metal hydride and water), and the additional non-fuel components can add as little as 0.8 grams weight to the micropower source 10, so that the overall specific energy of the micropower source 10 is 0.95 Watt-Hours per gram, about four times better than a typical primary lithium battery.

FIG. 2 shows an exemplary construction of the micropower source 10 configured as a C-cell sized power generator. The micropower source 10 is housed in a cylindrical housing 20 which houses the water reservoir 12 and the solid fuel reservoir 14 such that the solid fuel reservoir 14 forms a core that is surrounded by the water reservoir 12. The fuel in the solid fuel reservoir 14 may be in the form of solid metal hydride pellets 15. The pneumatic valve 16 includes a valve disk 22 that cooperates with a valve seat 24 to regulate the amount of water vapor diffusing from the water reservoir 12 to the solid fuel reservoir 14. The valve disk 22 is coupled to a valve diaphragm 26 by way of a valve stem 28 so that, as the internal hydrogen gas pressure changes, the diaphragm deflects to move the valve disk 22 in relation to the valve seat 24 to regulate the amount of water vapor diffusing from the water reservoir 12 to the solid fuel reservoir 14.

The fuels cells 18 are in contact with air and hydrogen. Porous barriers 21 hold the water in the water reservoir 12 and the solid metal hydride pellets 15 in their proper positions.

FIG. 3 summarizes the chemical processes in the micropower source 10.

The present invention relates to a power source which provides higher power levels, specific energies, and/or energy densities.

SUMMARY OF THE INVENTION

According to one aspect of the present invention, a power generator comprises a hydrogen flow path, a humid air flow path, a fuel cell, and a water exchange membrane. The hydrogen flow path contains a hydrogen-containing fuel and a flow inducer, the hydrogen-containing fuel reacts with moisture in the hydrogen flow path to produce hydrogen, and the flow inducer induces a flow in the hydrogen flow path. The fuel cell is between the hydrogen flow path and the humid air flow path such that the fuel cell reacts with the hydrogen in the hydrogen flow path to produce electricity and such that moisture in the humid air flow path is produced by the reaction of the fuel cell. The water exchange membrane is between the hydrogen flow path and the humid air flow path and permits the moisture in the water vapor flow path to be supplied to the hydrogen flow path.

According to another aspect of the present invention, a method of generating electricity comprises the following: supplying moisture to a hydrogen flow path; inducing a flow in a hydrogen flow path, wherein the flow contains the moisture, and wherein the hydrogen flow path contains a hydrogen-containing fuel that reacts with the moisture to produce hydrogen; and, directing the hydrogen produced by the hydrogen-containing fuel to a fuel cell that reacts with the hydrogen to produce electricity.

According to still another aspect of the present invention, a method of generating electricity comprises the following: reacting moisture with a metal hydride in a hydrogen flow path so as to produce hydrogen; directing the hydrogen through the hydrogen flow path to a fuel cell that reacts with the hydrogen to produce electricity and moisture; and, supplying the moisture produced by the fuel cell to the hydrogen flow path as the principal moisture that reacts with the metal hydride.

BRIEF DESCRIPTION OF THE DRAWINGS

These and other features and advantages will become more apparent from a detailed consideration of the invention when taken in conjunction with the drawing in which:

FIG. 3 shows the chemical processes for the micropower source shown in FIG. 1;

DETAILED DESCRIPTION

The micropower source 10 discussed above is extremely simple and efficient for mW level power generation. However, the micropower source 10 employs a slow natural evaporation and diffusion rate of moisture from its water reservoir 12, that significantly limits power generation. Moreover, the water that is produce by the fuel cells 18 is exhausted as waste, which limits the smallest size ands weight of the fuel required by the micropower source 10. As can be seen from the chemical reaction sequence of FIG. 3, in principle it is not necessary to re-supply water to the micropower source 10 because the natural action of the fuel cells 18 produces water at exactly the rate required by the chemical reaction between the water vapor and the fuel.

Figure 1:
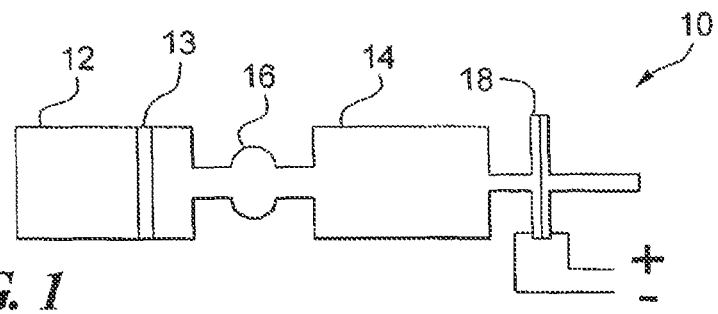
FIG. 1 is a schematic diagram of a micropower source previously developed by the assignee of the present invention.
Figure 2:
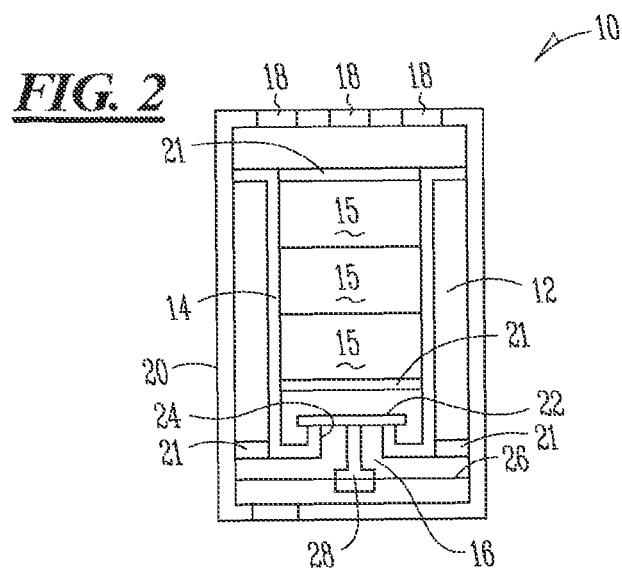
FIG. 2 shows an exemplary construction of the micropower source shown in FIG. 1.
Figure 4:
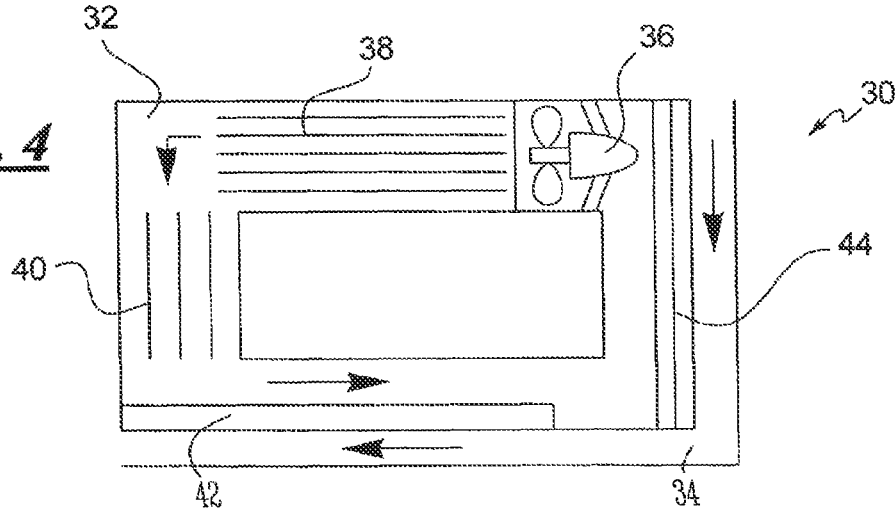
FIG. 4 is a schematic diagram of a closed-cycle micropower source in accordance with one embodiment of the present invention; and, FIG. 5 shows an exemplary construction of the closed-cycle micropower source shown in FIG. 4.

FIG. 4 shows a closed-cycle micropower source 30 in accordance with one embodiment of the present invention. The closed-cycle micropower source 30 includes a hydrogen flow path 32 and a humid air flow path 34. A flow inducer 36 such as a fan, pump, impeller, etc. induces a flow through the hydrogen flow path 32. Similarly, an inducer such as a fan, pump, impeller, etc. (not shown in FIG. 4) induces a flow through the humid air flow path 34. Atomized water droplets may be initially injected (not shown) into either the hydrogen flow path 32 or the humid air flow path 34 in order to produce the initial humidification of hydrogen in the hydrogen flow path 32.

The flow of humidified hydrogen in the hydrogen flow path 32 passes through a fuel reservoir 38 which contains, for example, a solid fuel such as a metal hydride. Although many metal hydrides can be used in the fuel reservoir 38, $LiBH_4$ and $LiAlH_4$ contain a good amount of hydrogen energy per unit weight. For example, $LiBH_4$ contains about 1.7 times as much energy as $LiAlH_4$, and thus could potentially give 36% hydrogen by initial weight. At depletion, the fuel will have gained a factor of 3.9 times in weight due to accumulated oxygen. However, the chemical reaction between $LiBH_4$ and water vapor produces an alkaline "slurry" which reduces the reaction rate resulting in a chemical reaction that typically only proceeds to 30% of completeness. $LiAlH_4$ does not show this problem, and gives close to 100% completeness. If methods (e.g., added acids or catalysts) can eliminate this effect in $LiBH_4$, then $LiBH_4$ may be a better fuel than $LiAlH_4$.

The fuel reservoir 38 may contain the required amount, such as a few grams, of the metal hydride that reacts with water vapor in the hydrogen flow to generate dry hydrogen. The dry hydrogen passes through a heat exchanger 40 in the hydrogen flow path 32 to maintain ambient temperature. That is, the exothermic heat generated by the reaction of the water vapor and the metal hydride in the fuel reservoir 38 (about 15 Watts) can be passively passed by the heat exchanger 40 to ambient air.

The dry hydrogen in the hydrogen flow path 32 passes by a water exchange membrane 42, such as a polymer permeation-exchange barrier. The large relative humidity difference between the moist flow in the humid air flow path 34 and the dry hydrogen in the hydrogen flow path 32 induces water vapor permeation across the water exchange membrane 42 into the dry hydrogen gas without a latent heat change. Breathable polymers (e.g., Goretex, PEBA, PVOH, Nafion, etc.) have very high permeability to water vapor and can be used for the water exchange membrane 42. Thus, water vapor from the humid air flow path 34 passes to the hydrogen flow path 32 in order to humidify the hydrogen in the hydrogen flow path 32.

The humidified hydrogen then flows past the membrane electrode assembly (MEA) of one or more fuel cells 44, such as Nafion fuel cells, where part of the hydrogen (about 2 cc/sec) is consumed at the anode of the membrane electrode assembly of the fuel cells 44 so as to generate electrical power and evolve water at the cathode of the membrane electrode assembly. Accordingly, replacement hydrogen is generated by the fuel in the fuel reservoir 38, matching the hydrogen consumption rate of the fuel cells 44.

The flow of air or other carrier in the humid air flow path 34 counter-flows past the cathode of the fuel cells 44 and is humidified by the water evolved by the fuel cells 44. This water vapor is extracted downstream back to the hydrogen by the water exchange membrane 42. If the water cycle is completely efficient, the system naturally stays in balance as shown in FIG. 3, with water and hydrogen generated exactly as needed, according to the electrical power withdrawn. If the water cycle is not completely efficient, a small reservoir can be provided in the humid air flow path 34 or the hydrogen flow path 32 so as to inject water that is otherwise lost in the closed cycle micropower source 30. Thus, in practice, a small water injection system (not shown) may be necessary for start-up and replacement of lost water.

Figure 5:
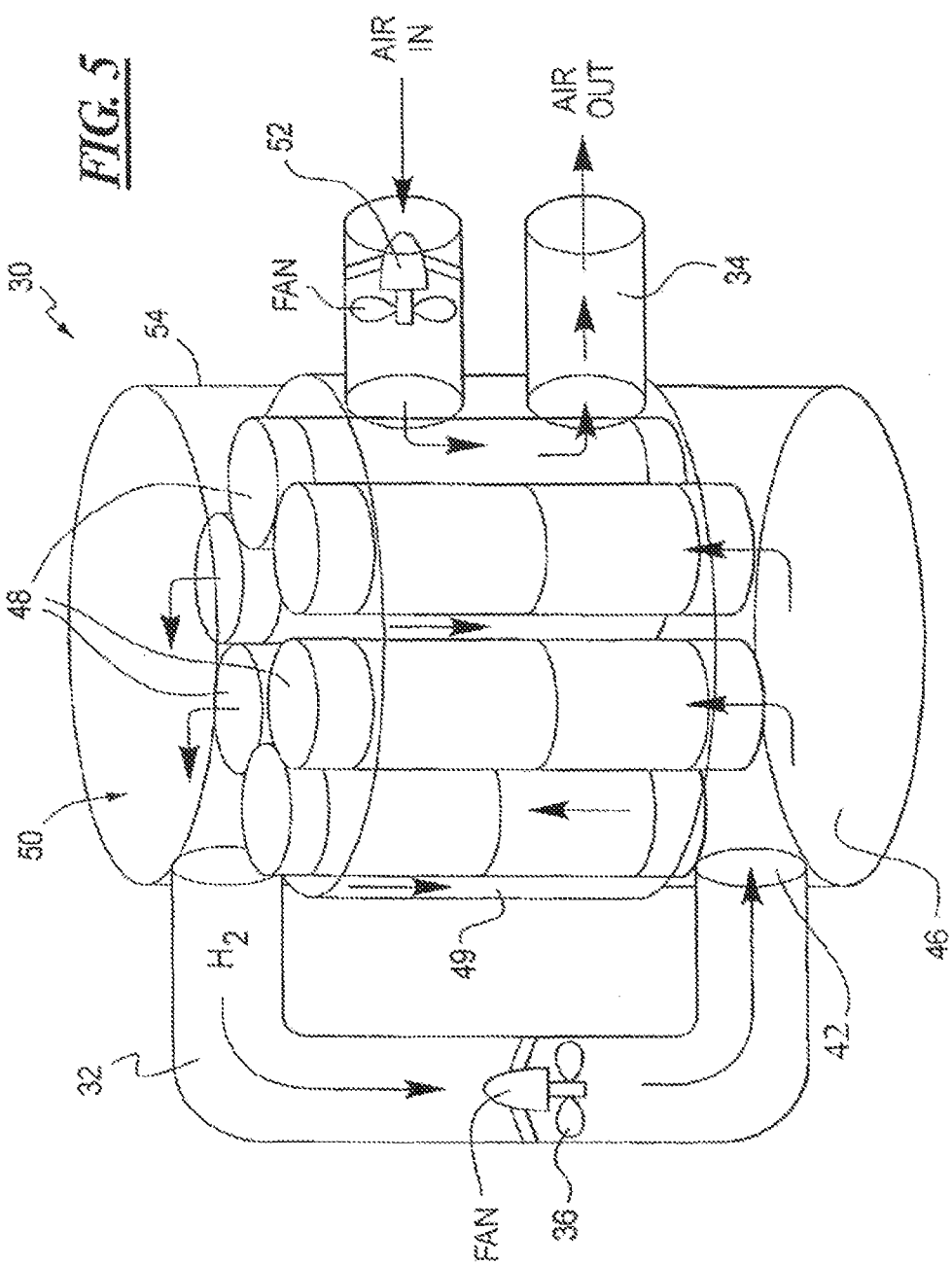

FIG. 5 shows an exemplary construction of the closed-cycle micropower source 30 of FIG. 4. Hydrogen circulates continuously in the hydrogen flow path 32 into a lower manifold 46 that distributes the hydrogen flow upwards through an array of vertical tubes 48 in a central manifold 49. The vertical tubes 48 are surrounded by downwardly flowing humid air in the humid air flow path 34. The hydrogen in the hydrogen flow path 32 flows upwards through the vertical tubes 48 and is collected from the vertical tubes 48 by an upper manifold 50 under inducement from the flow inducer 36. The upper portions of the vertical tubes 48 are coated with fuel cell electrode material and the lower portions of the vertical tubes 48 are coated with the water exchange membrane 42. The vertical tubes 48 in the central manifold 49 contain the fuel such as a solid fuel in the form of metal hydride fuel rods. The vertical tubes 48, for example, may be Nafion polymer tubes.

As discussed above, hydrogen is created in hydrogen flow path 32 by the reaction of water vapor, from the humid air flow path 34 through the water exchange membrane 42 coating the lower portions of the vertical tubes 48, with the metal hydride fuel, thus drying the hydrogen gas. Water vapor released at the fuel cell cathodes of the vertical tubes 48 is carried in a counter flow opposite to the flow of hydrogen by the humid air flow path 34 and permeates through the water exchange membrane 42 to the dry hydrogen gas, completing the water cycle. The heat exchanger 40 is not shown in FIG. 5 but could be included in the hydrogen flow path 32 to maintain ambient temperature as discussed above. The counter flow in the humid air flow path 34 may be created by a flow inducer 52 such as a fan, pump, impeller, etc. Alternatively, counter flow in the humid air flow path 34 may be created by using aerodynamic pressure in moving vehicle applications.

The vertical tubes 48 and the lower and upper manifolds 46 and 50 are contained in a cylindrical housing 54. The cylindrical housing 54 may be constructed of gas impermeable, metallized thin-walled plastic tubing for light weight.

Accordingly, all or the majority of the required water is provided by a closed cycle, so that very little water is required to be loaded, with a major savings in weight of water initially required and resulting higher specific energy. Instead of relying on the natural evaporation rate of water (about 1 e-7 cc/sec), an inducer, such as a micro water pump, may be used to initially inject water at the rate required for high electrical power (1.5 e-3 cc/sec of water is required to generate sufficient hydrogen for 10 Watts system output power). Suitable pumps, such as the MDP1304 micropump are commercially available, for example, from thinXXS Microtechnology. An ultrasonic atomizer can be used to initially mechanically inject micro-droplets of liquid water into the forced flow hydrogen gas stream, which initially produces sufficient humidified hydrogen for system startup. Such ultrasonic devices are used in household humidifiers. The flow rate of hydrogen gas required to transport 1.5 e-3 cc of water per second in vapor form at 100% RH at 5 C is about 200 cc/sec. Such gas flows can be produced by miniature low-power commercial fans (such as Sunon Inc #5F852, 0.25 W, 1.8 grams).

Since the water cycle will probably not be completely efficient, some additional water may be injected into the hydrogen stream from a small water reservoir. This injection rate may be used to control the hydrogen generation rate.

An appropriate flow rate of hydrogen gas is about 200 cc/sec. This flow rate ensures that the required amount of water can be transported as humid hydrogen gas. The 3.7 Watts of latent heat required for water evaporation is free, in the sense that it is supplied by heat conduction from the system's surroundings, and places no load on the electrical system.

The humid air flow path 34 also provides air to the cathode side of the fuel cells 44. The air flow rate required is usually about twice the stochiometric rate (about 6 cc/sec) to avoid oxygen depletion at the cathode surface.

At 10 W output electrical power and with a typical cell voltage of 0.65 V, the fuel cells 44 are expected to be 50% efficient, and dissipate an additional 10 W as heat. In the event that Nafion is used for the fuel cells 44, this dissipated heat should be helpful in keeping the Nafion warm, and producing water vapor at the cathode.

A small amount of a barrier material such as oil may be added to the metal hydride in order to slow its otherwise potentially explosive reaction with water, while still allowing an adequate reaction rate for controlled hydrogen generation. Liquid water can be kept from freezing by adding a small amount of alcohol. Alcohol reacts with LiAlH4 to also produce hydrogen.

Certain modifications of the present invention have been discussed above. Other modifications will occur to those practicing in the art of the present invention. For example, as described above, the heat exchanger 40 is used in the hydrogen flow path 32 to maintain ambient temperature. However, the heat exchanger 40 need not be used.

Also, as described above, the water exchange membrane 42 is used to pass water vapor from the moist air flowing through the humid air flow path 34 to the dry hydrogen flowing through the hydrogen flow path 32. Alternatively, water vapor carried off in the humid air exiting the fuel cells 44 may be condensed by ducting this moist air past the cooler hydrogen gas, in effect using the latent heat of the cooling power. For example, condensed liquid water may be reintroduced into the hydrogen stream, such as by using a micropump and atomizer as described above for initial water injection.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A power generator comprising:
   a hydrogen flow path containing a hydrogen-containing fuel and a flow inducer, wherein the hydrogen-containing fuel reacts with moisture in the hydrogen flow path to produce hydrogen, and wherein the flow inducer induces a flow in the hydrogen flow path;
   a humid air flow path separate from the hydrogen flow path, wherein at least a portion of the humid air flow path runs next to a portion of the hydrogen flow path;
   a fuel cell between the hydrogen flow path and the humid air flow path such that at the anode the fuel cell reacts with at least a portion of the hydrogen in the hydrogen flow path to produce electricity and such that at least a portion of the moisture produced by the reaction of the fuel cell is introduced into the humid air flow path at the cathode of the fuel cell; and,
   a water vapor exchange membrane separate from the fuel cell and located between the portion of the hydrogen flow path and the portion of the humid air flow path that run next to each other, wherein the majority of the moisture required in the hydrogen flow path passes through the water vapor exchange membrane in the form of water vapor from the humid air flow path to the hydrogen flow path in an amount sufficient to provide a closed water supply.

2. The power generator of claim 1 wherein the hydrogen-containing fuel comprises a metal hydride.

3. The power generator of claim 2 wherein the metal hydride comprises $LiBH_4$.

4. The power generator of claim 2 wherein the metal hydride comprises $LiAlH_4$.

5. The power generator of claim 1 wherein the flow inducer in the hydrogen flow path comprises a first flow inducer, wherein the humid air flow path includes a second flow inducer, and wherein the second flow inducer induces a flow of the moisture in the humid air flow path.

6. The power generator of claim 1 wherein the initial water required in the hydrogen flow path is injected from a water reservoir into the hydrogen flow path.

7. The power generator of claim 1 wherein the water not provided from the humid air flow path is injected from a water reservoir into the hydrogen flow path.

8. The power generator of claim 1 wherein liquid water is injected into the hydrogen flow path as atomized droplets.

9. The power generator of claim 1 wherein the fuel cell comprises a Proton Exchange Membrane with an anode interfacing with the hydrogen flow path and a cathode interfacing with the humid air flow path.

10. The power generator of claim 9 wherein the flow inducer in the hydrogen flow path comprises a first flow inducer, wherein the humid air flow path includes a second flow inducer, and wherein the second flow inducer induces a flow of the moisture in the humid air flow path.

11. The power generator of claim 1 wherein hydrogen flow path further contains a heat exchanger.

12. The power generator of claim 11 wherein the fuel cell comprises a Proton Exchange Membrane with an anode interfacing with the hydrogen flow path and a cathode interfacing with the humid air flow path.

13. The power generator of claim 11 wherein the flow inducer in the hydrogen flow path comprises a first flow inducer, wherein the humid air flow path includes a second flow inducer, and wherein the second flow inducer induces a flow of the moisture in the humid air flow path.

14. The power generator of claim 13 wherein the fuel cell comprises a Proton Exchange Membrane with an anode interfacing with the hydrogen flow path and a cathode interfacing with the humid air flow path.

15. A method of generating electricity comprising:
supplying moisture to a hydrogen flow path from a separate humid air flow path;
permitting moisture from the separate humid air flow path to flow in the hydrogen flow path;
inducing a flow in a hydrogen flow path, wherein the flow contains the moisture, and wherein the hydrogen flow path contains a hydrogen-containing fuel that reacts with the moisture to produce hydrogen
directing the hydrogen produced by the hydrogen-containing fuel to a fuel cell that reacts with at least a portion of the hydrogen at the anode to produce electricity and moisture at the cathode;
directing moisture produced at the cathode of the fuel cell to the humid air flow path, and supplying a majority of that moisture into the hydrogen flow path to provide a closed water cycle;
wherein the supplying of the moisture produced at the cathode of the fuel cell to the hydrogen flow path comprises permeating moisture produced at the cathode of the fuel cell from the separate humid air flow path to the hydrogen flow path in the form of water vapor, through a water vapor exchange membrane located separate from the fuel cell.

16. The method of claim 15 wherein the hydrogen-containing fuel comprises a metal hydride.

17. The method of claim 16 wherein the metal hydride comprises $LiBH_4$.

18. The method of claim 16 wherein the metal hydride comprises $LiAlH_4$.

19. The method of claim 15 wherein the fuel cell comprises a Proton Exchange Membrane with an anode interfacing with the hydrogen flow path and a cathode interfacing with a humid air flow path, and wherein the supplying of moisture to the hydrogen flow path comprises supplying the moisture produced by the fuel cell cathode to the humid air flow path and then to the hydrogen flow path.

20. The method of claim 15 wherein hydrogen flow path further contains a heat exchanger.

21. A method of generating electricity comprising:
reacting moisture with a metal hydride in a recirculating hydrogen flow path so as to produce hydrogen;
directing the hydrogen through the hydrogen flow path to a fuel cell that reacts with at least a portion of the hydrogen at the anode of the fuel cell to produce electricity and moisture;
supplying a majority of the moisture produced by at the cathode of the fuel cell to the hydrogen flow path via a separate humid air flow path coupled to the hydrogen flow path by permeation in the form of water vapor, through a water vapor exchange membrane located separate from the fuel cell to provide a closed water cycle; and
permitting the flow of moisture in the hydrogen flow path to the metal hydride, such that further hydrogen may be generated.

22. The method of claim 21 wherein the metal hydride comprises $LiBH_4$.

23. The method of claim 21 wherein the metal hydride comprises $LiAlH_4$.

24. The method of claim 21 wherein hydrogen flow path further contains a heat exchanger.

25. The method of claim 21 wherein the reacting of moisture with a metal hydride in a hydrogen flow path so as to produce hydrogen comprises inducing a flow of the moisture in the hydrogen flow path to the metal hydride.

26. A power generator comprising:
a recirculating hydrogen flow path containing a hydrogen-containing fuel and a flow inducer, wherein the hydrogen-containing fuel reacts with moisture in the recirculating hydrogen flow path to produce hydrogen, and wherein the flow inducer induces a flow in the recirculating hydrogen flow path;
a humid air flow path separate from the recirculating hydrogen flow path;
a fuel cell between the recirculating hydrogen flow path and the humid air flow path such that at the anode, the fuel cell reacts with at least a portion of the hydrogen in the recirculating hydrogen flow path and at the cathode the fuel cell reacts with oxygen in the humid air flow path to produce electricity and moisture; and such that moisture in the recirculating hydrogen flow path is produced by the reaction of the fuel cell and provided at the cathode to the humid air flow path; and,
a water vapor exchange membrane between the recirculating hydrogen flow path and the humid air flow path and located separate from the fuel cell, wherein the majority of the moisture required in the hydrogen flow path passes through the water vapor exchange membrane in the form of water vapor, from the humid air flow path to the recirculating hydrogen flow path and to contact the hydrogen-containing fuel for further hydrogen generation;
such that the water supply is closed.

* * * * *